United States Patent
Lochocki, Jr. et al.

(10) Patent No.: US 8,313,415 B2
(45) Date of Patent: Nov. 20, 2012

(54) METHOD AND APPARATUS FOR CLUTCH CONTROL IN A VEHICLE HAVING AN ENGINE START-STOP POWERTRAIN AND A DUAL-CLUTCH TRANSMISSION

(75) Inventors: Ronald F. Lochocki, Jr., Ypsilanti, MI (US); John E. Marano, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 412 days.

(21) Appl. No.: 12/753,190

(22) Filed: Apr. 2, 2010

(65) Prior Publication Data

US 2011/0245036 A1    Oct. 6, 2011

(51) Int. Cl.
*B60K 23/00* (2006.01)
*B60W 10/02* (2006.01)
*B60W 10/06* (2006.01)
*B60W 10/10* (2006.01)

(52) U.S. Cl. ........................... 477/167; 477/180

(58) Field of Classification Search ............... 477/77, 477/83, 115, 167, 180, 181
See application file for complete search history.

(56) References Cited

U.S. PATENT DOCUMENTS

| 7,252,621 | B2 * | 8/2007 | Tanba et al. | 477/77 |
| 2010/0099536 | A1 * | 4/2010 | Vennemann | 477/77 |

* cited by examiner

*Primary Examiner* — Edwin A Young
(74) *Attorney, Agent, or Firm* — Quinn Law Group, PLLC

(57) ABSTRACT

A vehicle includes an engine that shuts down and restarts at idle, a dual-clutch transmission (DCT) having a controller and two input clutches for connecting the engine to respective evenly and oddly numbered gears of the DCT. The controller has a shift algorithm for shifting the DCT to achieve a predetermined engine load state during an engine autostart/autostop cycle, with the load state being unloaded or partially loaded. A DCT for the vehicle includes the input clutches and controller. A method includes shifting the DCT to the predetermined engine load state while the engine is off and an engine restart is commanded, and restarting the engine in the engine load state. The method may also include maintaining the clutches at a first point relative to a kiss point of the input clutches when the load state is unloaded, and at a second point when the load state is partially loaded.

14 Claims, 3 Drawing Sheets

METHOD AND APPARATUS FOR CLUTCH CONTROL IN A VEHICLE HAVING AN ENGINE START-STOP POWERTRAIN AND A DUAL-CLUTCH TRANSMISSION

TECHNICAL FIELD

The present invention relates to a method and apparatus for shift control in a vehicle having a dual-clutch transmission (DCT) and an engine start-stop powertrain.

BACKGROUND OF THE INVENTION

Some vehicle powertrains have the capability to selectively shut down the engine whenever the vehicle is stopped in order to minimize idle fuel consumption. Such functionality is commonly referred to as "autostop/autostart", and is widely present in hybrid vehicles, although it is not limited to such powertrains. Control of the vehicle transmission during engine restart and vehicle launch typically occurs via shift algorithms programmed within a transmission controller, which may be stand alone or distributed within a larger vehicle control architecture.

A dual-clutch transmission (DCT) is an automated, manual-like transmission having a gearbox with two independently-operated torque transfer mechanisms or clutches. Associated electronic and hydraulic clutch control devices control the shift operation of the DCT. In a DCT, one input clutch controls the oddly-numbered gears, e.g., first, third, fifth, and reverse in a 7-speed transmission, while another input clutch controls the evenly-numbered gears, e.g., second, fourth, and sixth in the same 7-speed transmission. Using this arrangement, the gears of a DCT can be shifted without totally interrupting power flow from the engine.

SUMMARY OF THE INVENTION

Accordingly, a method and an apparatus are provided herein for use with a vehicle having a dual-clutch transmission (DCT) and engine autostart/stop functionality as described above. The method, which may be embodied as an algorithm and executed by a vehicle transmission controller, allows the engine to completely shut down and restart in either an unloaded or a partially-loaded state. Shutting down of the engine reduces idle fuel consumption, as is well understood in the art and noted above. However, an unloaded engine shutdown sequence may result in an extended duration of engine spin. Therefore, within the scope of the present invention, a partial loading of the crankshaft may occur under certain operating conditions to expedite braking of the engine. Upon restart of the engine, the engine may be at least partially loaded while actively "spinning up" to shorten the time to launch, without adversely shocking the initial forward acceleration of the vehicle body. The present invention uses the "kiss-point" of a given input clutch of the DCT in order to determine precisely when and how to unload the input clutch. As used herein, the term "kiss-point" refers to the point in time at which an input clutch just begins to make frictional contact during its engagement, i.e., the point of incipient capacity.

In particular, a vehicle includes an engine adapted to automatically shut down and restart during an engine autostop/autostart cycle to thereby minimize idle fuel consumption, a DCT having a pair of input clutches, one being selectively engageable to connect the engine to oddly numbered gears of the DCT, and the other being selectively engageable to connect the engine to evenly numbered gears of the DCT; and a controller. The controller has a shift algorithm adapted for shifting the DCT to achieve a predetermined engine load state during the engine autostart/autostop cycle. The predetermined engine load state is one of a fully unloaded state and an at least partially loaded state.

A DCT is also provided for a vehicle, the vehicle having an engine adapted to automatically shut down and restart during a vehicle idle condition during an engine autostop/autostart cycle. The DCT includes a controller and a pair of input clutches. One input clutch is selectively engageable to connect the engine to oddly numbered gears of the DCT, and the other input clutch is selectively engageable to connect the engine to evenly numbered gears of the DCT. The controller has a shift algorithm adapted for shifting the DCT to achieve a predetermined engine load state during the engine autostart/autostop cycle. The predetermined engine load state is one of an unloaded state and an at least partially loaded state.

A method for shifting the DCT includes determining when the engine is shut down, shifting the DCT to a predetermined engine load state while the engine is in an off state, the predetermined engine load state being one of an unloaded state and an at least partially loaded state, and restarting the engine in the predetermined engine load state. The method may also include maintaining the input clutches of the DCT at a first predetermined point relative to a kiss point of the input clutches when the predetermined engine load state is the unloaded state, and at a second predetermined point relative to a kiss point of the input clutches when the predetermined engine load state is the partially loaded state.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
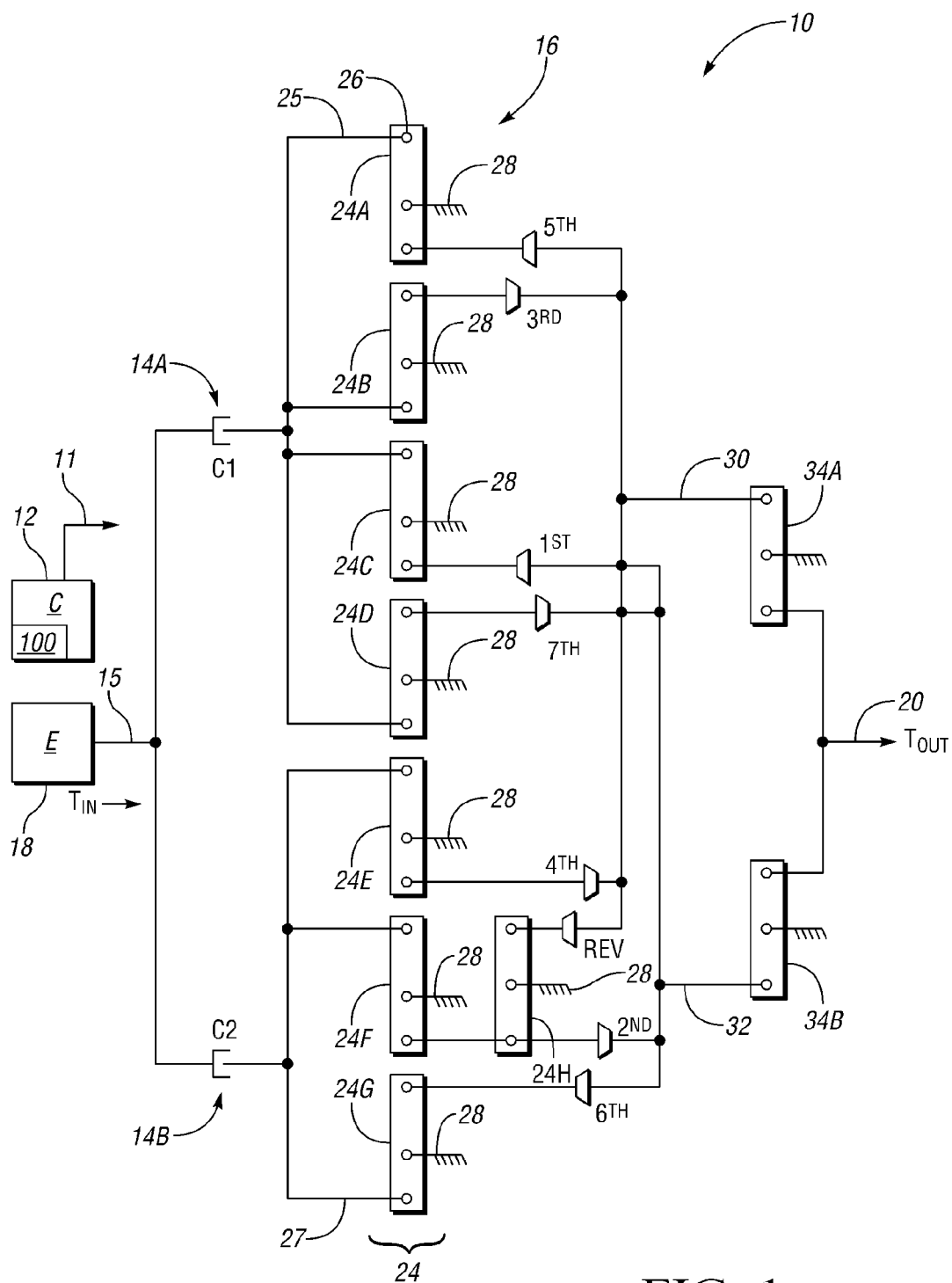
FIG. 1 is a lever diagram of a vehicle having a dual-clutch transmission (DCT), engine autostart-stop functionality, and a shift control algorithm in accordance with the present invention.

Referring to the drawings, wherein like reference numbers correspond to like or similar components throughout the several figures, a vehicle 10 is shown in FIG. 1 that includes a transmission controller (C) 12 having a shift control algorithm 100 in accordance with the invention, as described below with reference to FIGS. 2A-3. The controller 12 is adapted for executing the algorithm 100 to control actuation of one or both of a pair of input clutches 14A, 14B of a dual-clutch transmission (DCT) 16. As shown, the DCT 16 is a 7-speed transmission, although one may configure the DCT as desired, e.g., 5-speed, 6-speed, 7-speed, 8-speed, or more.

Vehicle 10 includes an engine (E) 18 having a crankshaft 15 baring an input torque ($T_{IN}$). The engine 18 is adapted to shut down and restart in a partially-loaded or a fully unloaded state, as determined by the algorithm 100. That is, the engine 18 has autostart/stop functionality as described above, i.e., the engine may be selectively shut down or turned off to reduce idle fuel consumption during an engine autostop/autostart cycle. A motor (not shown) may be used to crank and restart the engine 18, as understood in the art. The DCT 16 includes an output shaft 20 connected to a set of road wheels (not shown). The output shaft 20 ultimately carries a transmission output torque ($T_{OUT}$) from various gear sets 24 of DCT 16 to thereby propel the vehicle 10. The gear sets 24 may be selectively actuated using electrical and/or hydraulic controls, according to signals 11 communicated by controller 12.

The DCT 16 may include, according to one embodiment, a first shaft 25, a second shaft 27, and gear sets 24A-H, each having a plurality of nodes 26, of which one in each gear set is grounded to a stationary member 28, e.g., a transmission case or housing. First shaft 25 is connected to and drives the odd gear sets, e.g., gear sets 24A-D in a 7-speed transmission as shown. First shaft 25 is therefore labeled in FIG. 1 as the "odd shaft". Second shaft 27 is connected to and drives the even gear sets, e.g., gear sets 24E-H in the 7-speed transmission shown in FIG. 1, with gear set 24H providing the required gearing for the reverse mode. Second shaft 27 is therefore labeled in FIG. 1 as the "even shaft". DCT 16 further includes an upper and lower main shaft 30, 32, respectively, which are connected to final drive gear sets 34A, 34B. Final drive gear sets 34A, 34B are in turn connected to the output shaft 20 to provide any required final gear reduction. Throughout FIG. 1, the trapezoidal shaped symbols represent clutch synchronizers, as is well understood in the art.

Still referring to FIG. 1, data used by algorithm 100 may reside within or may be accessible by the controller 12, and may be sampled or processed thereby during transmission states such as $1^{st}$ gear or higher, neutral (N), and park (P). Vehicle data that may be sampled in order to determine appropriate shift conditions for input clutches 14A, 14B may include, but are not necessarily limited to, vehicle output speed, throttle level, braking level, a PRNDL setting, onboard diagnostics, etc.

The controller 12 may be configured as a microprocessor-based device having such common elements as a microprocessor or CPU, memory including but not limited to: read only memory (ROM), random access memory (RAM), electrically-erasable programmable read-only memory (EE-PROM), etc., and circuitry including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry. However configured, the controller 12 is operable for executing at least the algorithm 100 of FIG. 3 as needed to provide the required shift control of DCT 16.

Figure 2A:
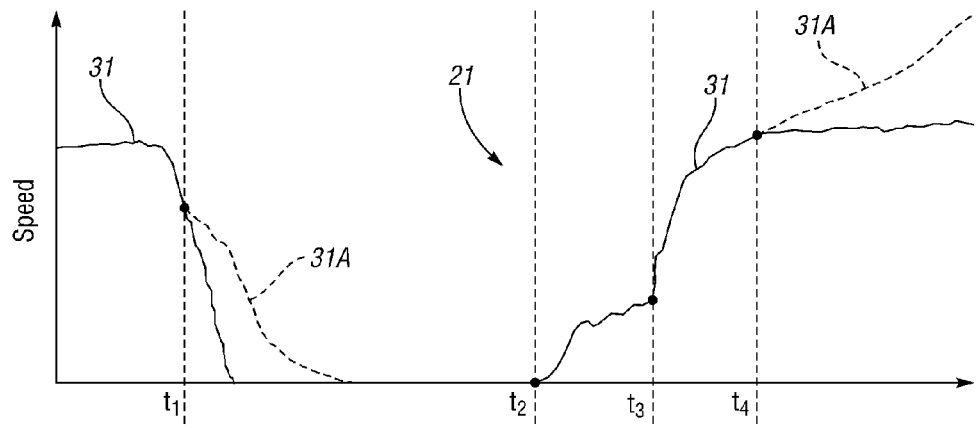
FIG. 2A is a plot of engine speed vs. time for the vehicle shown in FIG. 1.
Figure 2B:
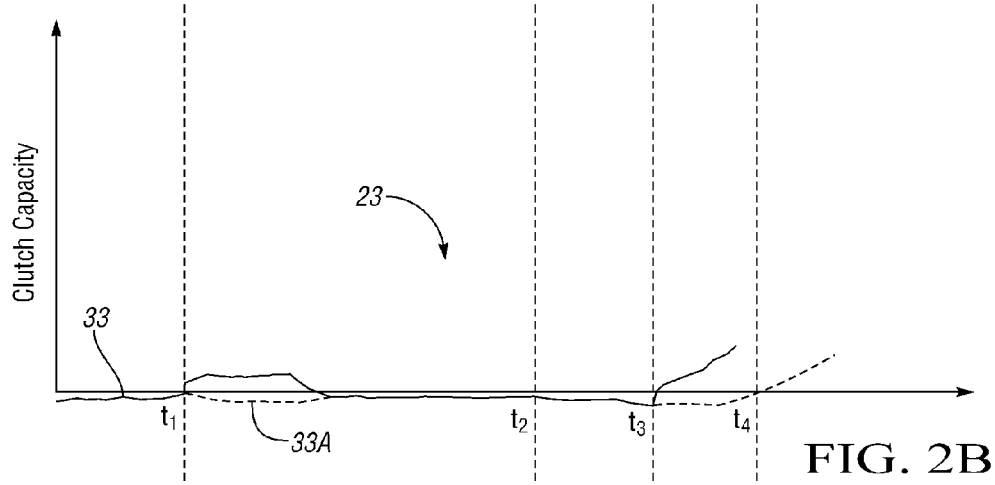
FIG. 2B is a plot of clutch capacity vs. time for the vehicle shown in FIG. 1.
Figure 2C:
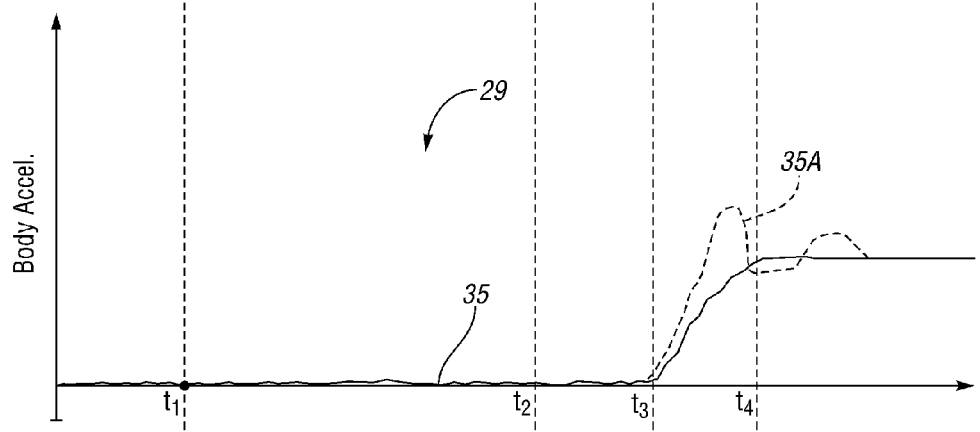
FIG. 2C is a plot of body acceleration vs. time for the vehicle shown in FIG. 1.

Referring to FIGS. 2A-C, a set of vehicle performance plots are shown for the vehicle 10 of FIG. 1, including an engine speed plot 21 of FIG. 2A, a clutch capacity plot 23 of FIG. 2B, and a vehicle body acceleration plot 29 of FIG. 2C. In FIG. 2A, an engine speed trace 31 is shown via plot 21. At $t_1$, during engine shutdown, engine speed rapidly declines relative to an unloaded crankshaft of engine 18, as shown by trace 31. The unloaded engine speed trace 31A is also plotted for comparison in plot 21.

In FIG. 2B, also at $t_1$, the clutch capacity time plot 23 shows that a clutch capacity trace 33 for the input clutches 14A, 14B is held above the kiss point relative to an unloaded engine condition, as represented by the clutch capacity trace 33A. Note that engine speed trace 31A and clutch capacity trace 33A correspond to an engine speed "sail on" condition, or the extended duration of engine spin noted above.

At $t_2$, restart of engine 18 is initiated, e.g., when brake capacity and/or brake pedal position reaches a calibrated threshold. Note in FIG. 2A the rise in speed trace 31. Clutch control may commence at approximately $t_3$, and a suitable engine run flag, for example "0", may be set at this point. Clutch capacity rises at $t_3$, as shown in FIG. 2B, and is held above the kiss point. As shown in body acceleration plot 29 in FIG. 2C, acceleration trace 35 begins to rise at $t_3$, indicating a launch of the vehicle 10. Trace 35A indicates a launch profile for a too heavily loaded launch, i.e., a launch occurring with excessive clutch capacity, or without a properly shaped engine torque profile at start up. At $t_4$, a suitable engine run flag, for example a flag of "1", may be set to indicate the latest possible entry point for clutch control. Engine speed trace 31 flattens out in a zero-throttle condition after $t_4$, otherwise rising as indicated by engine speed trace 31A.

Figure 3:
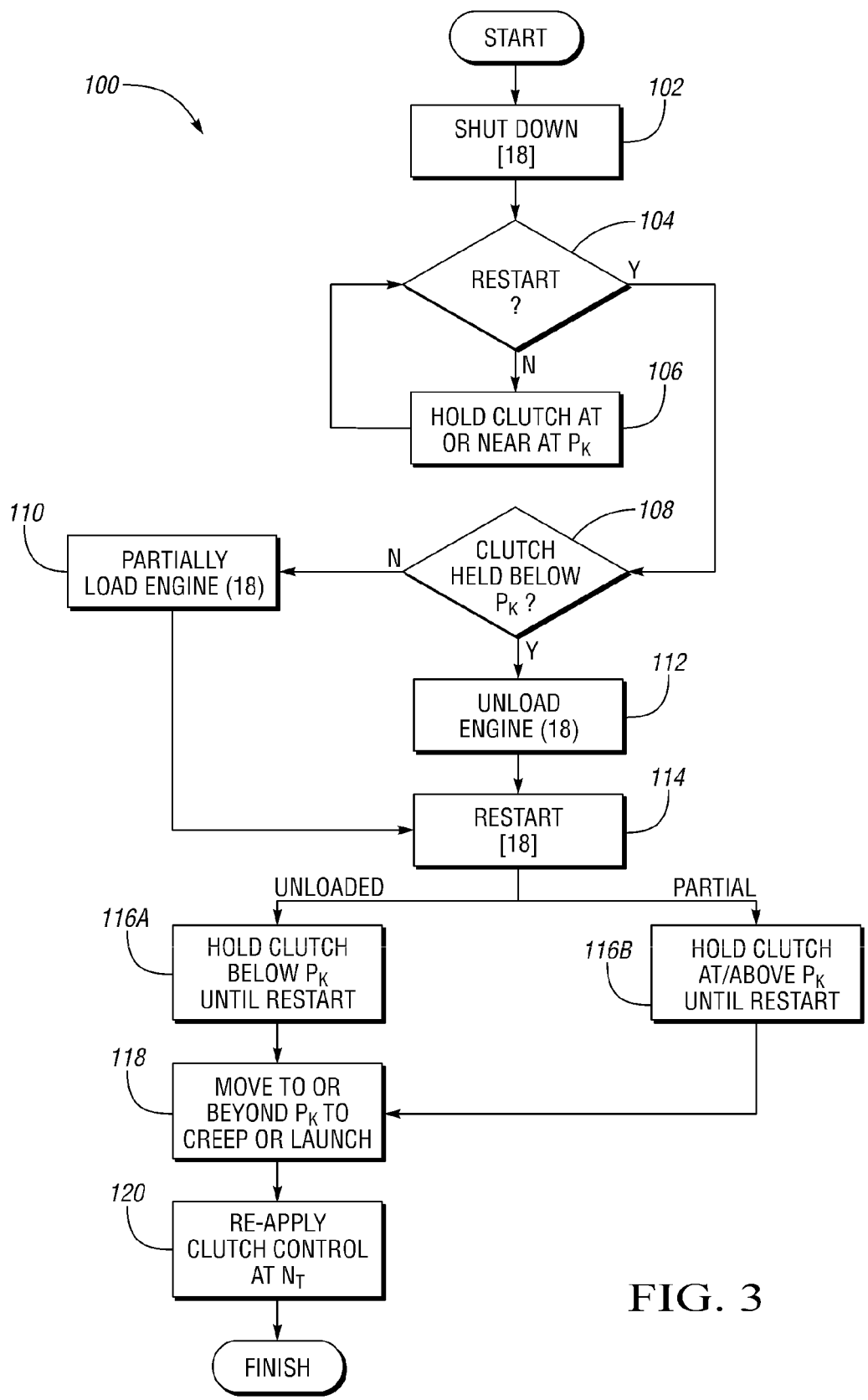
FIG. 3 is a flow chart describing a shift control algorithm for the DCT of the vehicle shown in FIG. 1.

Referring to FIG. 3 in conjunction with the structure of vehicle 10 shown in FIG. 1, execution of algorithm 100 by the controller 12 allows the engine 18 to be shut down and restarted in either an unloaded or an at least partially-loaded state. Algorithm 100 begins with step 102 during a coast-down of the vehicle 10, wherein the engaged input clutch 14A or 14B is held at or just below the kiss point at the final moments prior to the vehicle reaching a stop. After engine shut down, the clutch 14A or 14B is held just below the kiss point. Algorithm 100 proceeds to step 104.

At step 104, the algorithm 100 determines whether a restart is commanded by the controller 12, or by a separate controller. If so, the algorithm 100 proceeds to step 108, and if not, the algorithm proceeds to step 106.

At step 106, the clutch 14A or 14B is held at the kiss point ($P_K$), and the algorithm 100 returns to step 104 as explained above.

At step 108, the algorithm 100 determines whether the input clutch 14A or 14B is held below the kiss point ($P_K$) after engine shut down, or if the clutch is held at or above the kiss point. If at or above, the algorithm 100 proceeds to step 110. If below, the algorithm 100 proceeds to step 112.

At step 110, the crankshaft 15 is partially loaded, and the algorithm 100 proceeds to step 114.

At step 112, the crankshaft 15 is unloaded, and the algorithm 100 proceeds to step 114.

At step 114, restart of engine 18 is initiated. The algorithm 100 proceeds to step 116A if the crankshaft 15 is unloaded, and to step 116B if the crankshaft is partially loaded, as determined above at steps 110 and 112, respectively.

At step 116A, the clutch 14A or 14B is held at or slightly below the kiss point ($P_K$) until the engine 18 fully restarts. The algorithm 100 then proceeds to step 118.

At step 116B, the clutch 14A or 14B is held at or slightly above the kiss point ($P_K$) until the engine 18 fully restarts. The algorithm 100 then proceeds to step 118.

At step 118, the controller 12 moves to the kiss point or beyond until the vehicle 10 begins to creep or pull away during launch. The algorithm 100 then proceeds to step 120.

At step 120, clutch control is reapplied at a predetermined point in the restart, e.g., based on the speed of the engine 18.

Accordingly, execution of the algorithm 100 using the controller 12 allows the engine 18 to shut down and restart in an unloaded or a partially loaded state in a DCT-equipped vehicle, e.g., the vehicle 10 of FIG. 1. Execution of the algorithm 100 may provide a more optimal driveline feel during engine restart and shutdown, while eliminating idle fuel consumption.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
    an engine adapted to automatically shut down and restart, wherein shutting down and restarting the engine defines an engine autostop/autostart cycle;
    a dual-clutch transmission (DCT) having a pair of input clutches, one being selectively engageable to connect the engine to oddly numbered gears of the DCT, and the other being selectively engageable to connect the engine to evenly numbered gears of the DCT; and
    a controller having a shift algorithm adapted for shifting the DCT to achieve a predetermined engine load state during the engine autostart/autostop cycle;
    wherein the predetermined engine load state is one of an unloaded state and a partially loaded state.

2. The vehicle of claim 1, wherein the shift algorithm is adapted for maintaining the input clutches of the DCT at a first predetermined point relative to a kiss point of the input clutches when the predetermined engine load state is the unloaded state, and at a second predetermined point relative to a kiss point of the input clutches when the predetermined engine load state is the partially loaded state.

3. The vehicle of claim 2, wherein the shift algorithm is adapted for transitioning the input clutches to the kiss point at a calibrated engine speed to thereby launch the vehicle.

4. The vehicle of claim 1, wherein the DCT has at least four evenly-numbered gear sets and at least four oddly-numbered gear sets.

5. The vehicle of claim 4, wherein one of the at least four oddly-numbered gear sets is a reverse gear set.

6. A dual-clutch transmission (DCT) for a vehicle, the vehicle having an engine adapted to automatically shut down and restart, wherein shutting down and restarting the engine defines an engine autostop/autostart cycle, the DCT comprising:
    a pair of input clutches, one being selectively engageable to connect the engine to oddly numbered gears of the DCT, and the other being selectively engageable to connect the engine to evenly numbered gears of the DCT; and
    a controller having a shift algorithm adapted for shifting the DCT to achieve a predetermined engine load state during the engine autostart/autostop cycle;
    wherein the predetermined engine load state is one of an unloaded state and a partially loaded state.

7. The DCT of claim 6, wherein the shift algorithm is adapted for maintaining the input clutches of the DCT at a first predetermined point relative to a kiss point of the input clutches when the predetermined engine load state is the unloaded state, and at a second predetermined point relative to a kiss point of the input clutches when the predetermined engine load state is the partially loaded state.

8. The DCT of claim 7, wherein the shift algorithm is adapted for transitioning the input clutches to the kiss point at a calibrated engine speed to thereby launch the vehicle.

9. The DCT of claim 1, wherein the DCT has at least four evenly-numbered gear sets and at least four oddly-numbered gear sets.

10. The DCT of claim 9, wherein one of the at least four oddly-numbered gear sets is a reverse gear set.

11. A method for shifting a dual-clutch transmission (DCT) having a pair of input clutches in a vehicle having engine autostop/autostart functionality, the method comprising:
    shifting the DCT to a predetermined engine load state while the engine is in an off state and an engine restart is commanded during an engine autostart/autostop cycle, the predetermined engine load state being one of an unloaded state and a partially loaded state; and
    restarting the engine in the predetermined engine load state.

12. The method of claim 11, further comprising: maintaining the input clutches of the DCT at a first predetermined point relative to a kiss point of the input clutches when the predetermined engine load state is an unloaded state, and at a second predetermined point relative to a kiss point of the input clutches when the predetermined engine load state is a partially loaded state.

13. The method of claim 12, further comprising:
    transitioning the input clutches to the kiss point at a calibrated engine speed to thereby launch the vehicle.

14. The method of claim 12, further comprising: holding the input clutches at the kiss point when the engine is off and the engine restart is not yet commanded.

* * * * *